May 14, 1929.  C. DAVIS  1,713,332
TRACTOR HITCH
Original Filed Dec. 22, 1926   2 Sheets-Sheet 2
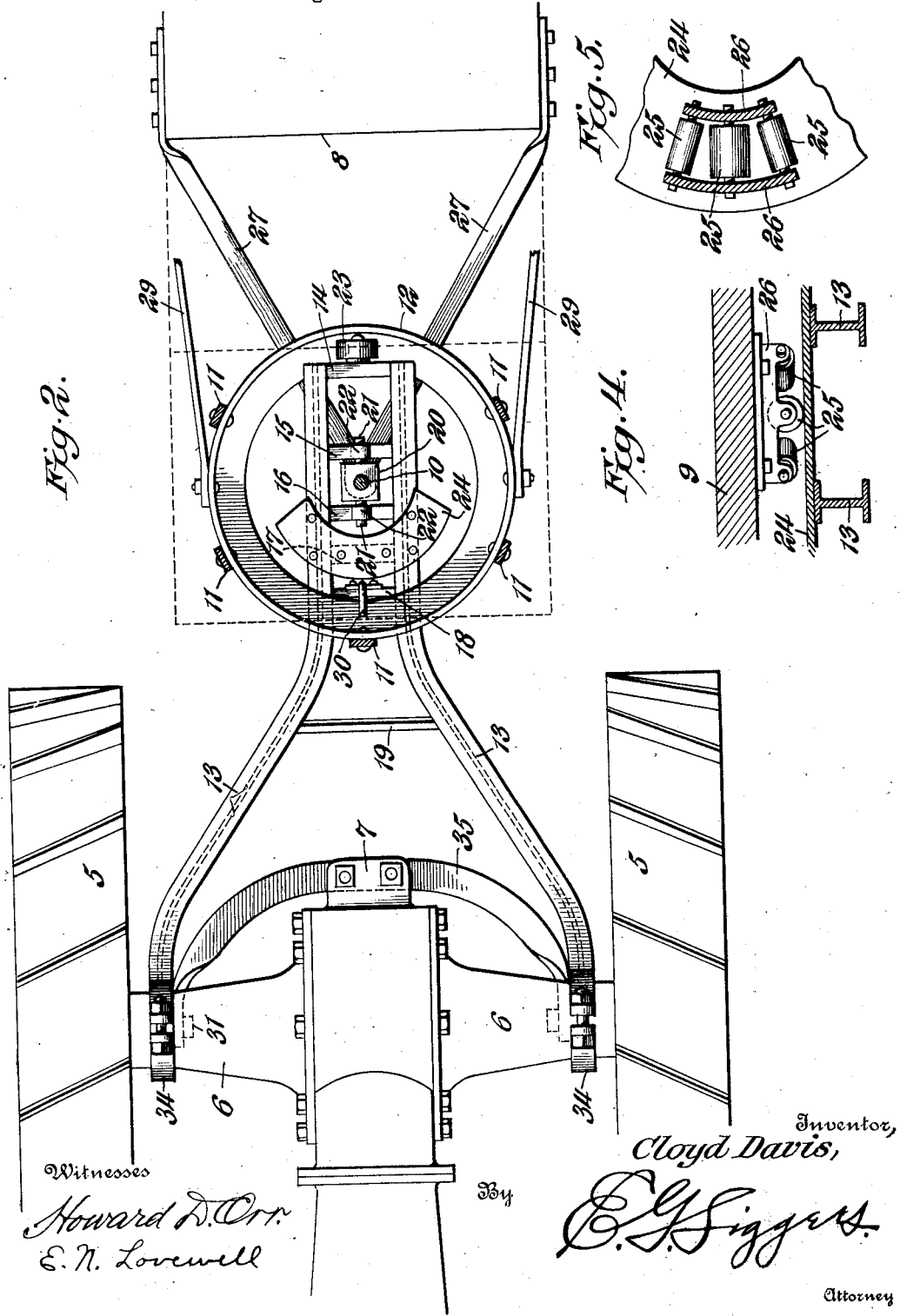
Witnesses
Howard D. Orr
E. N. Lovewell
Inventor,
Cloyd Davis,
By
Attorney Patented May 14, 1929.

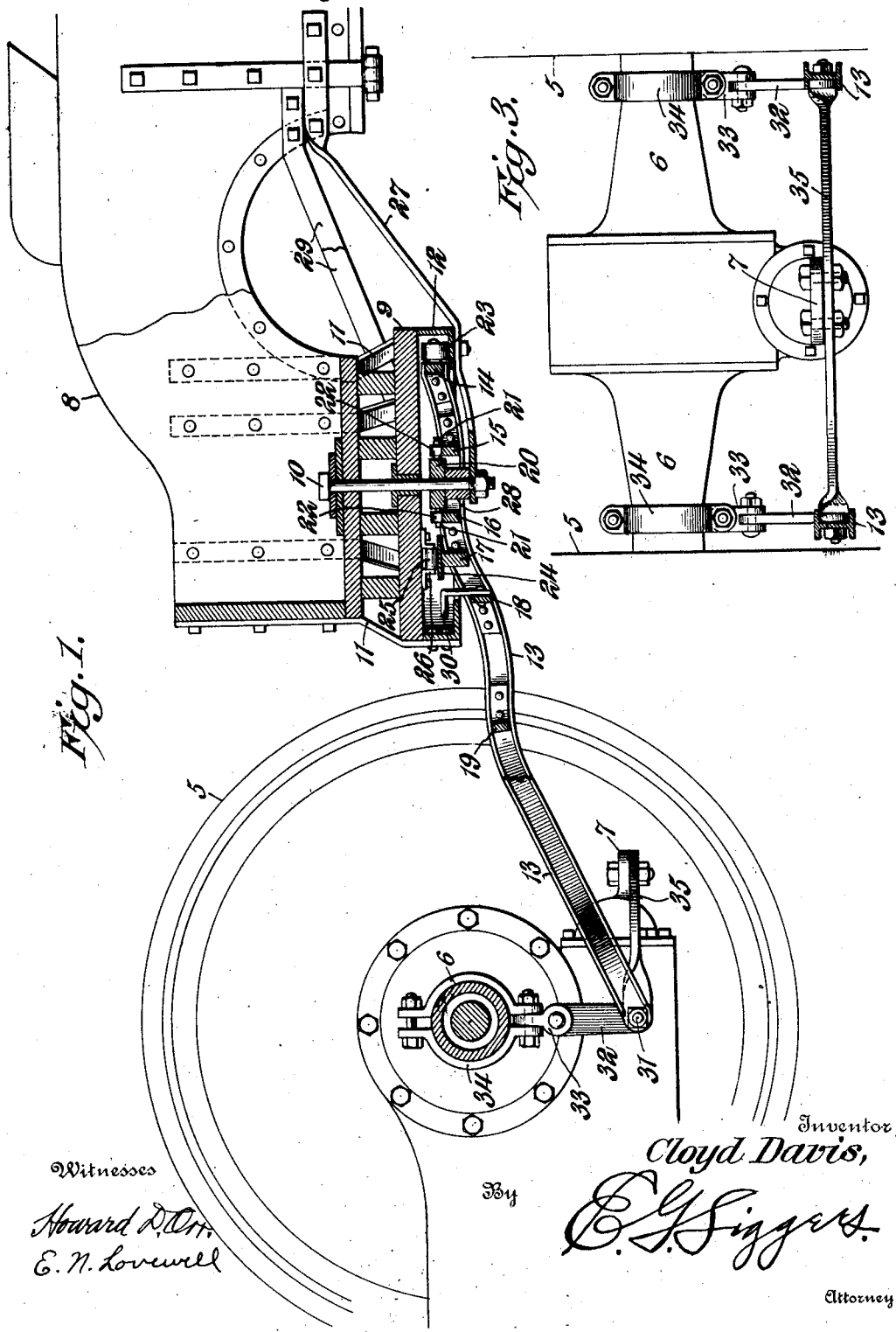

1,713,332

UNITED STATES PATENT OFFICE.

CLOYD DAVIS, OF MINEOLA, NEW YORK.

TRACTOR HITCH.

Application filed December 22, 1926, Serial No. 156,404. Renewed October 9, 1928.

This invention relates to a hitch adapted to be used on tractors for connecting a dump wagon or other trailer thereto. It is similar in its nature to the hitch disclosed in my earlier application, Serial No. 93,816, filed March 10, 1926, but embodies various improvements thereon.

One of the important objects of the present invention is to simplify the connection between the draw bar of the tractor and the front part of the wagon body, and to render it more flexible and more adaptable for the purpose intended, while at the same time counteracting the tendency of the front end of the tractor to rise up when the tractor is pulling a heavy load.

A further object is to arrange the elements comprising this connection in such a manner that the wagon cannot tip over transversely, when the tractor is traveling at right angles thereto. Further provision is made against a possible overturning of the wagon rearwardly by providing a hook to positively limit any upward movement of the front end of the wagon body, and the draft connection by which the latter is hauled.

The invention consists further in various details of construction and combinations of elements, the advantages of which will be more fully explained in connection with the accompanying drawings illustrating the invention in its preferred form.

In the drawings:

Figure 1 is a longitudinal sectional view through the device, shown in connection with the adjacent portions of a tractor and an ordinary dump wagon.

Figure 2 is a plan view thereof, the wagon being shown diagrammatically.

Figure 3 is a rear elevation of the axle housing with the hitch connected therewith.

Figures 4 and 5 are detail views of the rollers and parts associated therewith for connecting the hitch with the wagon body.

The preferred embodiment of the invention is shown in connection with a tractor of well-known construction, having rear tractor wheels 5, disposed at opposite ends of an axle housing 6, and having the usual draw bar 7. As shown, the hitch is connected to the front end of the wagon body 8 after the front wheels and axle have been removed therefrom, and the front end of the wagon body is thus supported from the rear end of the tractor while it is being hauled thereby.

The attachment, which constitutes the subject matter of the invention, is connected to the structure 9 underneath the front end of the wagon after the fifth wheel and axle have been removed therefrom, the king bolt 10 remaining in the same position as before. Herein the attachment is shown as including a plurality of depending hangers 11 which are secured to the front end of the wagon, and a circular track 12, angular in cross section, which is rigidly secured to the lower ends of the hangers. The draft connection comprises a pair of I-beams 13, the rear portions of which are substantially parallel, and the front portions of which diverge forwardly and downwardly. The two beams 13 are rigidly connected by a number of cross braces, as indicated at 14, 15, 16, 17, 18 and 19. A pivot block 20 is disposed between two of the cross braces, as 15 and 16, and is provided with trunnions 21, mounted in bearings 22 on the upper sides of the cross braces. The block 20 is rotatable about the king bolt 10, and the beams 13, through the block 20, have a rotatable connection with the king bolt, and may also be rocked laterally about the trunnions 21.

A roller 23, mounted on the rear side of the rear cross members 14, bears upon the circular track 12, and an arcuate plate 24, secured in front of the king bolt to one of the cross braces, as 17, bears against rollers 25, which are mounted in brackets 26, secured to the face of the structure 9. Thus, as the front ends of the beams 13 are supported by the tractor, they support the front end of the wagon body 8, and may turn about the king bolt 10 to follow the tractor. The trunnions 21 permit the beams 13 and the tractor to rock laterally with respect to the wagon to compensate for inequalities in the ground, and to permit such movement to take place freely, it is expedient to provide three rollers 25, the central roller being somewhat larger than the other two.

The lower end of the king bolt 10 is strongly braced by bars 27, secured at their rear ends to the sides of the wagon body 8, and connected at their front ends to the king bolt, a suitable spacing block 28 being interposed between the brace bars and the pivot block 20. The brace bars 27 are intermediately secured to the circular track 12. The track 12 is further braced by brace bars 29, extending from opposite sides thereof to the wagon body. In order to positively counteract any tendency of the wagon to tip over away from the tractor when the tractor is traveling at right angles thereto and to prevent the front end of the body from raising when in alignment with the tractor, a hook 30 is secured to one of the cross braces, as 18, and extends over the track 12, so as to act as a stop as soon as the wagon body commences to tip or raise.

The front ends of the beams 13 are adapted to be connected by pivot bolts 31 to links 32, which are supported by connecting pieces 33 from clips 34, which are clamped to the axle housing 6. The front ends of the beams 13 are spaced apart a sufficient distance so that the clips 34 may be secured to the axle housing near the outer ends of the latter, and the links 32 are of sufficient length to support the pivots 31 substantially in the same horizontal plane as the draw bar 7 of the tractor. A yoke 35 is secured centrally to the draw bar 7, and the arms of the yoke extend laterally and forwardly therefrom, and are connected to the front ends of the beams 13 by the pivot bolts 31.

By reason of the structure above described, it will be noted that the trunnions 21 permit the wagon body to rock laterally, independently of the tractor without unnecessary strain on the king bolt. The weight of the front end of the wagon body is supported by the rollers 23 and 25 without any strain on the king bolt, and these rollers permit a lateral turning movement without unnecessary friction. The weight of the wagon body, through the beams 13, bears directly downwardly upon the axle housings at widely separated points adjacent to the traction wheels, where there is least tendency to strain the tractor structure. The power for hauling the wagon is transmitted from the draw bar 7, through the yoke 35 to the forward ends of the beams 13, and exerts a direct pull on the latter. The strain of the forward pull on the beams 13 is taken up largely by the brace bars 27 and 29, thus relieving, to a large extent, the strains which would otherwise be placed upon the king bolt. Any tendency which there would otherwise be for the front end of the tractor to buck under a heavy load is counteracted by the draft through the beams 13 which are connected through the yoke 35 to the under side of the bar 7, so that its thrust is up under the bar 7, causing the front end of the tractor to be pushed into the ground. The removal of the front wheels of the wagon permits the latter to be hitched more closely to the tractor, and a shorter turn in trailing the tractor may be effected than is possible when using an ordinary hitch. It also distributes to the tractor wheels of the tractor, through the links and the beams 13, part of the weight of the load, thereby increasing the traction.

While I have shown and described in considerable detail the characteristic features of the invention, it will be obvious that the same may be considerably modified without departing from the spirit of the invention as embodied in the appended claims.

What is claimed is:

1. In a hitch for a tractor having a rearwardly disposed draw bar, the combination of a yoke, means for securing the yoke centrally to said draw bar with the ends of the yoke beneath the axle housing of the tractor, draft beams connected to the ends of the yoke and extending rearwardly, and means for supporting the ends of said yoke and the front ends of said draft beams from the axle housing.

2. In a hitch for a tractor having a rearwardly disposed draw bar, the combination of a plurality of draft beams, means for supporting the forward ends of said beams from the axle housing of the tractor, and means for transmitting tractive power from the draw bar of the tractor directly to said beams at the points where the latter are connected to the supporting means.

3. In a hitch for a tractor having a rearwardly disposed draw bar, the combination of a pair of clips adapted to be clamped to the axle housing, links depending in a substantially vertical direction from said clips, draft beams connected at their forward ends to said links, and unitary means including rigid arms for connecting said links and draft beams to the draw bar of the tractor.

4. In a hitch for a tractor having a rearwardly disposed draw bar, the combination of a pair of draft beams, means for supporting the forward ends of said beams from the axle housing of the tractor, a yoke having arms with opposed spaced ends, means for securing the yoke centrally to the draw bar of the tractor with its arms extending outwardly and forwardly underneath the axle housing, and means for connecting the ends of the yoke arms to the forward ends of said draft beams.

5. In a hitch for a tractor having a rearwardly disposed draw bar, the combination of a pair of clips adapted to be clamped to the axle housing, links depending in a substantially vertical direction from said clips, draft beams connected at their forward ends to said links, a yoke having arms with opposed spaced ends, means for securing the yoke centrally to the draw bar of the tractor with its arms extending outwardly and forwardly from beneath the axle housing, and means for connecting the ends of the yoke arms to the forward ends of said draft beams.

6. A hitch for connecting a wagon to the rearwardly projecting draw bar of a tractor, said hitch comprising a pair of spaced draft beams with cross braces rigidly connecting them, one of said cross braces having a bearing for receiving the king bolt of the wagon, means cooperating with the draft beams to support the front end of the wagon after the front wheels and axle are removed therefrom, means for supporting the front ends of the draft beams directly beneath the axle housing of the tractor near the tractor wheels, and means for transmitting tractive power from the draw bar of the tractor directly to the front ends of the draft beams which are beneath the axle housing.

7. A hitch for connecting a wagon to the rearwardly projecting draw bar of a tractor, said hitch comprising a pair of spaced draft beams with cross braces rigidly connecting them, one of said cross braces having a bearing for receiving the king bolt of the wagon, means cooperating with the draft beams to support the front end of the wagon after the front wheels and axle are removed therefrom, means for connecting the front ends of the draft beams to the axle housing of the tractor on opposite sides of the differential, a yoke having arms with opposed spaced ends, means for securing the yoke centrally to the draw bar of the tractor with its arms extending outwardly and forwardly and connected to the front ends of the draft beams which are connected to the axle housing.

8. A hitch for connecting a wagon to the rearwardly projecting draw bar of a tractor, said hitch comprising a pair of spaced draft beams with cross braces rigidly connecting them, one of said cross braces having a bearing for receiving the king bolt of the wagon, means cooperating with the draft beams to support the front end of the wagon after the front wheels and axle are removed therefrom, clips adapted to be clamped to the axle housing, links depending in a substantially vertical direction from said clips and connected to the forward ends of said draft beams, and unitary means including rigid arms for connecting said links and draft beams to the draw bar of the tractor.

9. A hitch for connecting a wagon to the rearwardly projecting draw bar of a tractor, said hitch comprising a pair of spaced draft beams with cross braces rigidly connecting them, one of said cross braces having a bearing for receiving the king bolt of the wagon, means cooperating with the draft beams to support the front end of the wagon after the front wheels and axle are removed therefrom, clips adapted to be clamped to the axle housing, links depending in a substantially vertical direction from said clips and connected to the forward ends of said draft beams, a yoke having arms with opposed spaced ends, means for securing the yoke centrally to the draw bar of the tractor with its arms extending outwardly and forwardly underneath the axle, and means for connecting the ends of said yoke arms to the forward ends of said draft beams at the points where the latter are connected to said links.

10. A hitch for connecting a tractor to the front end of a wagon after the front wheels and axle have been removed from the latter, said hitch comprising a member to be secured to the underside of the wagon body about the king bolt, a second member having means at its forward end for connection to the axle housing of the tractor at opposite sides of the differential, a pivot block journaled on the king bolt and having a laterally rockable connection with said second member, cooperating elements on the respective members to support the front end of the wagon body and relieve the king bolt of bending strain, said elements comprising curved tracks substantially concentric with the king bolt, a roller riding on each track, and a pair of smaller rollers disposed on opposite sides of one of the first mentioned rollers to permit a limited lateral rocking movement of the wagon with respect to the tractor.

11. A hitch for connecting a tractor to the front end of a wagon after the front wheels and axle have been removed from the latter, said hitch comprising a member to be secured to the underside of the wagon body about the king bolt, a second member having means at its forward end for connection to the axle housing of the tractor at opposite sides of the differential, a pivot block journaled on the king bolt and having a laterally rockable connection with said second member, cooperating elements on the respective members to support the front end of the wagon body and relieve the king bolt of bending strain, said elements comprising curved tracks substantially concentric with the king bolt, a roller riding on each track, and a hook overhanging the track on one of said members and secured to the other member to engage the track and prevent the wagon from tipping over when the tractor is traveling in a direction at right angles thereto.

In testimony, that I claim the foregoing as my own, I have hereto affixed my signature.

CLOYD DAVIS.